June 2, 1964  G. A. GAGNON ETAL  3,134,982
PIN INSERTING MACHINE
Original Filed June 2, 1961  2 Sheets-Sheet 1
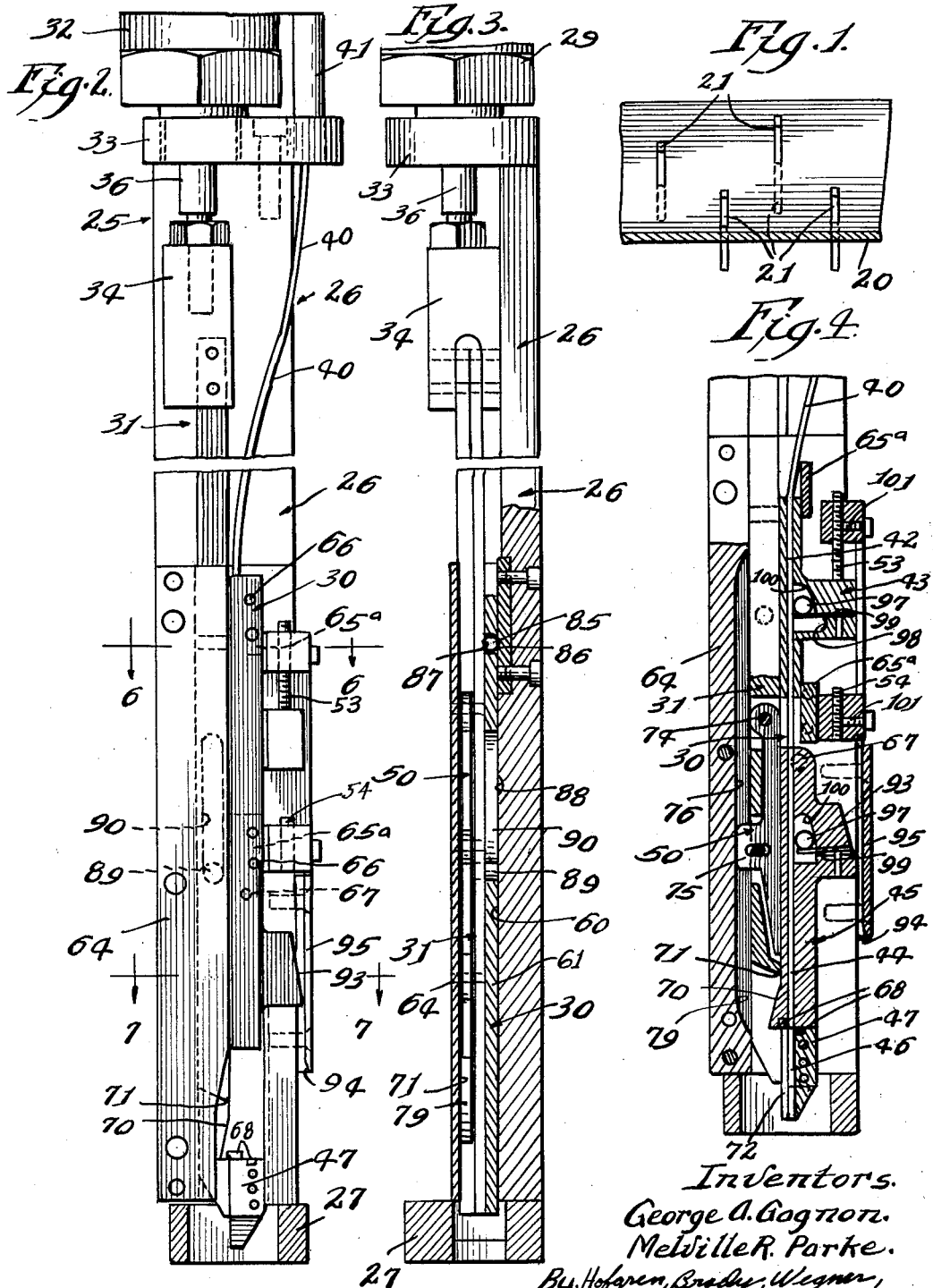
Inventors.
George A. Gagnon.
Melville R. Parke.
By Hofgren, Brady, Wegner,
Allen & Stellman
Attorneys.

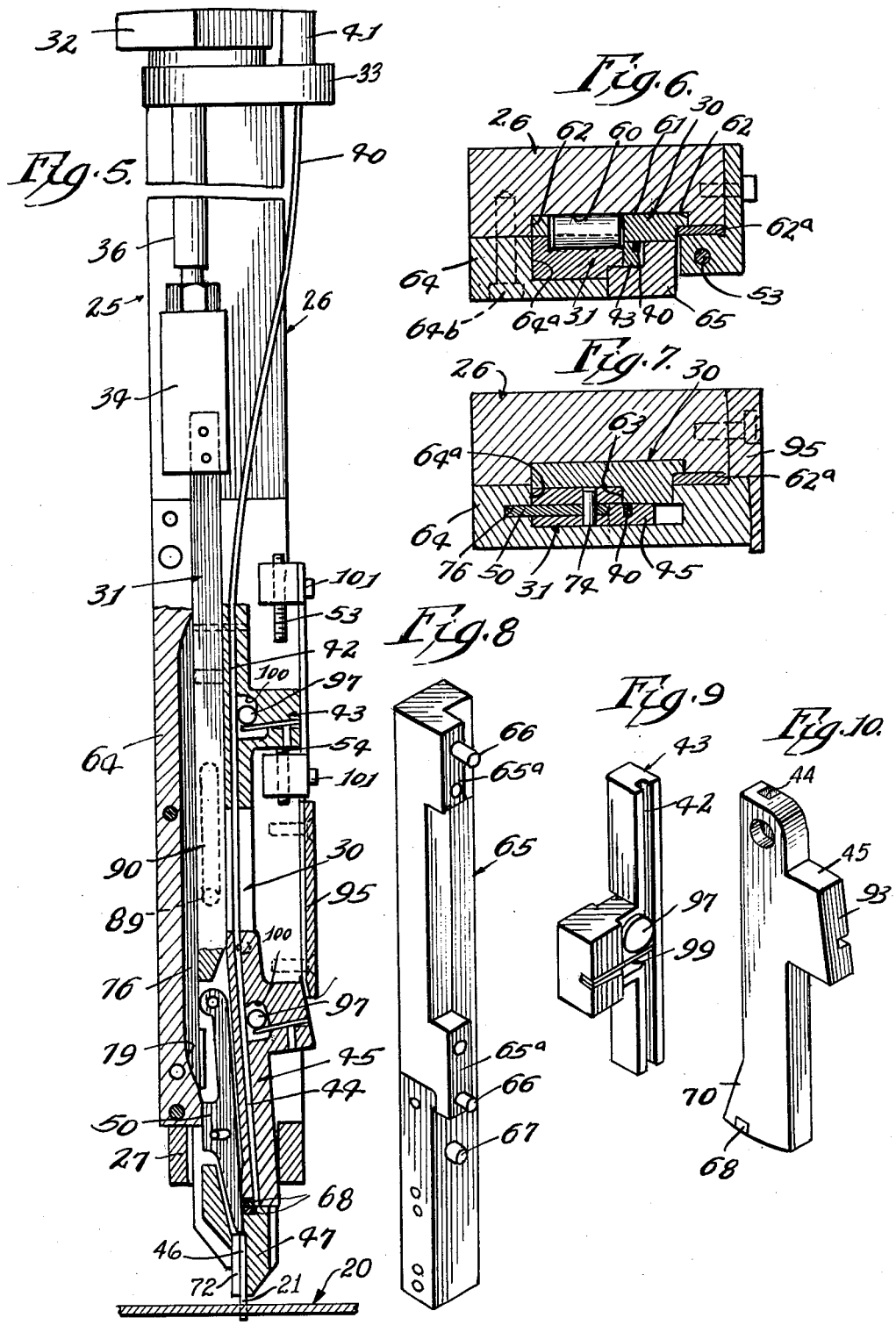

United States Patent Office 3,134,982
Patented June 2, 1964

3,134,982
PIN INSERTING MACHINE
George A. Gagnon, Wilmette, and Melville R. Parke, Arlington Heights, Ill., assignors to Warwick Manufacturing Corporation, a corporation of Delaware
Continuation of application Ser. No. 114,463, June 2, 1961. This application Nov. 19, 1962, Ser. No. 241,099
10 Claims. (Cl. 1—28)

This invention relates to the fabrication and installation of wire parts, and more particularly to a head for forming a rigid terminal pin from a strand of wire and inserting the pin in an electrical circuit mounting board.

The primary object of this invention is to provide a new and improved device for installing pins.

Another object is to provide a new and improved device for fabricating and installing terminal pins.

A further object is to provide a new and improved device for cutting segments of wire to form terminal pins, and installing the pins on an electrical circuit mounting board.

A more specific object is to provide a new and improved head having reciprocating parts movable in one direction for measuring a length of wire, cutting a previously measured and positioned length of wire to form a terminal pin, and inserting the pin in a mounting board, with these parts being movable in an opposite direction for positioning the measured length of wire to form another pin.

Other objects and advantages will become readily apparent from the following detailed description of a preferred embodiment taken in connection with the accompanying drawings, in which:

FIGURE 1 is a fragmentary, perspective view of an electrical circuit mounting board having mounted therein a plurality of pins cut and installed in the board by the head of this invention, with parts broken away for clearer illustration;

FIGURE 2 is a fragmentary, broken, front elevational view of a head for forming and installing pins in accordance with the invention, with parts of the head in a retracted position, and parts broken away or removed for clearer illustration;

FIGURE 3 is a fragmentary, broken, side elevational view, of the head in the position of FIGURE 2, with parts broken away or removed for clearer illustration;

FIGURE 4 is a fragmentary, front elevational view of a portion of FIGURE 2, in longitudinal section;

FIGURE 5 is a fragmentary, broken front elevational view, similar to FIGURE 2, but with the head approaching an extended position for setting a pin, with parts broken away or removed for clearer illustration;

FIGURE 6 is an enlarged, horizontal section taken generally along the line 6—6 of FIGURE 2;

FIGURE 7 is an enlarged, horizontal section taken generally along the line 7—7 of FIGURE 2; and, FIGURES 8, 9 and 10 are enlarged, perspective views of various parts removed from the head for clearer illustration.

While an illustrative embodiment of the invention is shown in the drawings and will be described in detail herein, the invention is susceptible of embodiment in many different forms, and it is to be understood that the present disclosure is to be considered as an exemplification of the principles of the invention and is not intended to limit the invention to the embodiment illustrated. The scope of the invention will be pointed out in the appended claims.

This application is a continuation of our application Serial No. 114,463, filed June 2, 1961, and now abandoned.

The invention is, in brief, directed to a head for forming rigid terminal pins from a strand of wire and inserting the pins in holes in electrical circuit mounting boards. Mechanism of the head including a slide and ram, are movable in one direction, from a retracted position to an extended position, for measuring a length of wire, cutting a previously measured and positioned length of wire to form a pin, and setting the pin in a hole in the mounting board. These parts are movable in an opposite direction, from extended to retracted position, for positioning the measured length of wire for subsequently forming another pin.

Referring to the drawings, FIGURE 1 illustrates an electrical circuit mounting board 20 having a plurality of relatively rigid terminal pins 21 extending through holes in the board. These pins are installed by a head 25 of this invention and are tightly held in the mounting board. The head is so constructed that the pins, which are usually about ¾ to 1 inch in length may be forced into holes substantially smaller than the pin without bending or otherwise damaging the pin or the mounting board. These pins are normally used for electrical connection of other electrical components to printed circuits on the mounting board 20, such as wire wrapped therearound as is well understood in the art.

FIGURES 2, 3 and 5, best illustrate a preferred embodiment of a head 25 in its entirety. The head has a generally upright rigid frame 26 with an outer lower end to which is rigidly secured an annular base 27 for mounting the head in a suitable jig (not shown) with the outer end of the frame overlying mounting board 20. A slide mechanism 30 is slidably mounted on frame 26, and a ram 31 is slidably mounted on slide 30, both for reciprocal movement along a generally upright path between a retracted position shown in FIGURES 2–4, and an extended position shown generally in FIGURE 5. Means for so reciprocally moving slide 30 and ram 31 are provided by a pneumatic motor 32 mounted on a flange 33 at an upper end of frame 26. Motor 32 is connected to a clevis 34 on ram 31 by a connecting rod 36.

A strand of wire 40 to be formed into terminal pins 21 is received by head 25 through a guide tube 41 extending upwardly from frame flange 33. The wire may be of any suitable type, and in the preferred embodiment is about ⅟₁₆ inch square and is fed to the head from a conventional coil or reel. In the retracted position, as may best be seen in FIGURE 4, wire strand 40 passes through three wire receiving channels. These channels include a channel 42 in a measuring and positioning part 43, a channel 44 in a cutting and holding member 45, and a channel 46 in an outer end portion 47 of slide 30. As illustrated in the drawing these channels are generally aligned and extend generally in the direction of the path of reciprocal movement of the slide and ram.

As the slide and ram move together from the fully retracted position, shown in FIGURES 2–4, they carry wire strand 40 downwardly until slide 30 is in fully extended position, as shown in FIGURE 5, and ram 31 is in an intermediate position (not shown). Ram 31 continues to move from its intermediate position toward its extended position and during such movement channel 44 in member 45 is moved out of alignment with slide channel 46, cutting wire strand 40 to form the terminal pin 21 which is held by a snug fit in slide channel 46. Continued movement of the ram from intermediate to extended position moves a ram pusher finger 50 from disalignment to alignment with slide channel 46. Further movement of the ram to extended position moves this finger downwardly into the open top of the slide channel 46 and through channel 46 to move pin 21 through this channel and insert the pin in a previously aligned hole in mounting board 20 which is suitably held below the base 27. FIGURE 5 shows finger 50 moving pin 21 out of body channel 46 just before ram 31 reaches its fully extended position.

Measuring and positioning part 43 is free to move with slide 30 between cooperating adjustable abutments 53 and 54 on frame 26. During movement of slide 30 from retracted to extended position, part 43 is stopped by abutment 54. Member 45 which moves with slide 30, holds wire strand 40 and pulls it through part channel 42 to measure a length of wire for forming another pin 21. As slide 30 moves from extended to retracted position member channel 44 is again aligned with slide channel 46. Wire strand 40 is carried along with the slide by friction until part 43 is stopped by abutment 53. Part 43 now holds wire strand 40 against movement with the slide as the slide and end portion 47 continue upward positioning the measured portion of wire in slide channel 46 preparatory to the next cycle.

In the preferred embodiment of head 25 illustrated in the drawings the frame 26 has a groove 60 (FIG. 6) extending upwardly from the lower outer end at annular base 27. Groove 60 is longitudinally aligned with the central opening in the annular base. This groove receives a body 61 of slide 30, and has opposed sides 62 which guide slide 30 for reciprocal movement between the retracted and extended positions. Slide body 61 includes lower outer end portion 47. The slide is retained on the frame by an upwardly extending plate 62a attached to the frame and overlapping a tongue on one side of the slide. Ram 31 is mounted adjacent slide 30 between an outwardly extending shoulder 63 on slide 30 and an opposed shoulder 64a on bar 64, secured to frame 26 as by suitable pins and bolts 64b. A portion of bar 64 overlies ram 31 for retaining the ram and slide properly positioned on the frame.

Cutting and holding member 45 is pivotally mounted on slide body 61 by a bar 65, shown separately in FIGURE 8. Bar 65 is firmly secured to slide body 61 by suitable bolts and pins 66 snugly received in cooperating holes in the slide body. This bar overlies a portion of measuring and positioning part 43 and has inwardly extending legs 65a for retaining part 43 on the frame. An outwardly extending pivot pin 67 on bar 65 is received in a hole in the upper end of member 45, mounting this member for pivotal movement transversely of groove 60 and slide channel 46 so that channel 44 is aligned with slide channel 46 in retracted position of the slide and is disaligned in extended position. Cooperating cutting edges 68 at adjacent ends of member channel 44 and slide channel 46 cut wire strand 40 as channel 44 is moved from alignment to disalignment with channel 46. These cutting edges are provided by suitable inserts in member 45 and slide end portion 47.

Cooperating means are provided on ram 31 and member 45 for moving member channel 44 from alignment to disalignment with body channel 46 to cut a measured length of wire strand 40 and form pin 21 as ram 31 moves from its intermediate position to extended position. Herein these means include an inclined cam portion 70 of member 45 and a cooperating lower end portion 71 of ram 31. Thus, as ram 31 moves from intermediate to extended position its end portion 71 engages inclined cam portion 70 on member 45 for pivoting member 45 counterclockwise from the position shown in FIGURE 4 to the position shown in FIGURE 5, thereby cutting wire strand 40. Inclined cam surface 70 is moved counterclockwise past body channel 46.

Continued movement of ram 31 to its extended position brings ram pusher finger 50 into alignment with body channel 46 and moves the finger through this channel for moving newly cut pin 21 through this channel, as illustrated in FIGURE 5, and inserting the pin in a hole in the mounting board 20. A slit 72 in slide outer end portion 47 opens into body channel 46 for the passage of the lower end of finger 50 through channel 46. Finger 50 is mounted on ram 31 by a pivot pin 74 for pivotal movement transverse to the path of reciprocal movement between disaligned and aligned positions with slide channel 46.

Cooperating means are provided on frame 26 and finger 50 for moving finger 50 from disaligned to aligned relationship with body channel 46. Herein these means are in the form of a boss 75 extending outwardly from finger 50 through a slot in ram 31 and received in an upwardly extending slot 76 in bar 64. An outer side of slot 76 is curved inwardly at its lower end, and after member 45 has cut wire 40 finger boss 75 engages curved surface 79 pivoting finger 50 counterclockwise into alignment with body channel 46.

Means are provided for latching the slide 30 and ram for movement together from retracted to extended position of the slide 30 as the ram 31 moves from retracted to intermediate position, and latching the slide and frame and releasing the ram for movement of the ram independently of and on the slide from intermediate position of the ram to extended position. As may best be seen in FIGURES 3 and 6, these means are in the form of a roller 85 received in a generally rectangular slit 86 in slide 30 and selectively received in a groove 87 in ram 31 for movement of the slide with the ram, and in a groove 88 in frame 26. Thus, as ram 31 is moved by pneumatic motor connecting rod 36 from fully retracted position shown in FIGURE 3, in which position roller 85 is in slide slit 86 and ram groove 87, the slide moves to its extended position with the ram. Cooperating abutments (not shown) on the frame and slide stop movement of the slide at its extended position. When slide 30 is in its extended position the roller 85 is adjacent frame groove 88 and moves out of ram groove 87 into the frame groove, holding slide 30 in its fully extended position and fixed with respect to frame 26. The ram is now in its intermediate or interchange position and is free to continue moving to its extended position. It is during this latter movement of ram 31 that member 45 is moved counterclockwise cutting wire strand 40, and ram pusher finger 50 is moved counterclockwise for inserting terminal pin 21 in the mounting board. A stop pin 89 on the ram is received in an upwardly extending slot 90 in the slide and engages opposite ends of this slot for limiting movement of the ram on the slide. In returning from extended position ram 31 moves over slide 30 to intermediate position and then roller 85 moves from groove 88 to groove 87 and the ram and slide move together to retracted position.

As pneumatic motor connecting rod 36 reverses its direction, ram 31 moves from extended toward retracted position and in so moving finger boss 50 clears curved cam surface 79 and the finger is free to move clockwise. Inclined cam surface 93 on cutting and holding member 45 engages a cooperating cam surface 94 on a side plate 95 on frame 26, rotating member 45 clockwise so that its channel 44 is again aligned with slide channel 46. This clockwise rotation of member 45 rotates finger 50 clockwise so that these parts are again in the position shown in FIGURE 4.

Separate and identical means are provided on measuring and positioning part 43 and on cutting and holding member 45 for holding wire strand 40 in channels 42 and 44, respectively, against movement away from slide end portion 46, and for movement through the channels toward the slide end portion and into body channel 46. These means are each in the form of a circular disc 97 received in a cut-out 98 opening into the respective channel. A leaf spring 99 urges the disc upwardly against an inwardly inclined cam surface 100 of the cut-out, which urges disc 97 against wire strand 40 in the channel. Thus, if wire strand 40 attempts to move upwardly with respect to part 43, disc 97 is more tightly clamped against the wire strand holding it against such movement. On the other hand, wire strand 40 is free to move downwardly through channel 42 and in so doing urges disc 97 downwardly against leaf spring 99 and the disc may move inwardly against cam surface 100 freeing wire strand 40.

As slide 30 moves from its extended to retracted position wire strand 40 moves upwardly frictionally with the slide until measuring and positioning part 43 engages upper abutment 53 on frame 26. Disc 97 of part 43 now holds wire strand 40 against further upward movement whereupon cutting and holding member channel 44 and slide channel 46 slide along wire strand 40 positioning a previously measured portion of the wire strand in body channel 46 to be cut into another pin 21. Upon subsequent movement of the slide from retracted to extended position disc 97 of cutting and holding member 45 clamps wire strand 40 in member 45 and when part 43 seats against abutment 54 continued movement of the slide toward extended position draws wire strand 40 through part channel 42, thus measuring another length of wire. The desired length of a terminal pin 21 may be obtained by adjusting abutments 53 and 54. As herein illuustrated, these abutments are provided by ends of set screws threadedly received in portions of the frame. These set screws may be held in place by other set screws 101 threadedly received in the frame portions for clamping engagement with the abutment set screws.

In a cycle of operation with the ram 31 in a retracted position, the measuring and positioning part 43 is located against stop 53 and the cutting and holding member 45 and end portion 47 of slide 30 have their respective channels 44 and 46 in alignment with the lower end of the wire 40 positioned in channel 46. Upon operation of the motor 32, the ram 31 and slide 30 move downwardly together and during this movement the measuring and posiitoning part 43 engages the lower abutment 54. The movement of the slide is then stopped with the outer end portion 47 located adjacent a circuit mounting board 20 as shown in FIGURE 5 and with the lower end of the wire 40 still integral with the remainder thereof and mounted in the end portion. The ram 31 then moves relative to slide 30 to cause the lower end portion 71 of ram 31 to engage cam portion 70 on cutting and holding member 45 to swing the latter member from the position shown in FIGURE 4 to that shown in FIGURE 5 which results in cutting the wire 40, thus leaving a pin in the lower end portion 47 ready for insertion in the board.

The ram 31 continues to move down further and the finger 50, by engaging the curved surface 79, is pivoted into alignment with the channel 46 in lower end portion 47 to push the pin out of this channel. The parts then start retracting movement with the ram 31 moving upwardly to return the finger 50 and holding member 45 to the positions shown in FIGURE 4. The ram, when in intermediate position, picks up the slide 30 for elevating movement of the slide and also the measuring part 43 and, once the measuring part 43 hits the abutment 53, it is stopped, while the slide continues to move and a length of wire 40 moves into the channel 46, with the parts then being in fully retracted position. In every cycle, the downward movement of the measuring part 43 draws a length of wire 40 out of the guide 41, so that when all the parts move upwardly in a retracting stroke there will be a length of wire that moves into the channel 46 to be subsequently formed into a pin.

Thus, a head is provided wherein parts are movable in a first direction for positioning a previously measured length of wire for forming a pin and these parts are movable in an opposite direction for measuring a length of wire, cutting the previously measured and positioned length of wire to form a pin, and moving the pin for release from the head and inserting the pin in a mounting board.

We claim:

1. A head for formig a pin from wire and installing the pin on a mounting board, comprising: a frame; a slide mounted for movement on said frame and having a channel for receiving the wire; a ram mounted for movement on said frame; a member having a channel for receiving said wire and mounted on said slide for movement of the member channel across said slide channel to cut the wire extending through said channels and form a pin in said slide channel; means responsive to movement of said ram for moving said member channel across said slide channel; a part movable by the slide and mounted for movement on said frame between abutments on the frame and having a channel for receiving said wire; independent means on said part and member for holding said wire against movement away from said slide channel; a finger on said ram mounted for movement through said slide channel to move said pin through the slide channel and install said pin on the mounting board in response to movement of said ram.

2. A head for forming a pin from wire and installing the pin on a mounting board, comprising: a frame; a mechanism mounted for movement in opposite directions on said frame; means responsive to movement of said mechanism in a first of said opposite directions for positioning a measured length of wire; means responsive to movement of said mechanism in the other of said opposite directions for measuring a length of wire, means responsive to movement of said mechanism in the other of said opposite directions for cutting the previously positioned measured length of wire to form a pin, and means responsive to movement of said mechanism in the other of said opposite directions for moving said pin for installation on the mounting board.

3. A head for forming a pin from wire and installing the pin on a mounting board, comprising: a frame; a slide mechanism mounted for reciprocal sliding movement in opposite directions on said frame; means for moving said mechanism in said opposite directions; means responsive to movement of said mechanism in a first of said opposite directions for positioning a measured length of wire; means responsive to movement of said mechanism in the other of said opposite directions for measuring a length of wire, means responsive to movement of said mechanism in the other of said opposite directions for cutting the previously positioned measured length of wire to form a pin, and means responsive to movement of said mechanism in the other of said opposite directions for installing said pin on the mounting board.

4. A head for forming a terminal pin from wire and installing the pin on a mounting board adjacent the head, comprising: a frame; a slide mounted on said frame for movement between a retracted position and an extended position, said slide having a channel for receiving the wire; a member having a channel for receiving said wire and mounted on said slide for movement of the member channel across said slide channel for cutting the wire extending through said channels to form a pin in said slide channel; a part mounted on said frame for free movement between abutments on said frame; and independent means on said part and member for holding said wire against movement in one direction for measuring a length of wire as said slide moves from retracted to extended position and for positioning a measured length of wire in said slide channel as said slide moves from extended to retracted position; a ram mounted adjacent said slide for movement between retracted and extended positions corresponding to retracted and extended positions of said slide, respectively; means moving said slide with said ram between retracted and extended position of the slide and retracted position and an intermediate position of the ram, respectively; cooperating means on said ram and member for moving said member channel across said slide channel as said ram moves from intermediate to extended position; a finger positioned on said ram for movement through said slide channel as said ram moves from intermediate to extended position after said member has cut said wire, for moving said pin through said slide channel and installing said pin on said mounting board, whereby movement of the slide and ram in a first direction, from extended to retracted position, positions a measured length of wire for forming a pin, and movement of said slide and ram in the opposite direction from retracted to extended position measures a length of wire, cuts the previously measured and positioned length of wire to form a pin, and inserts the pin in a mounting board.

5. A head for forming a rigid terminal pin from wire and installing the pin in a hole in a mounting board adjacent the head, comprising: a frame; a slide mounted on said frame for sliding movement in a reciprocal path between a retracted position and an extended position, said slide having an outer end portion with a channel extended generally in the direction of said path for receiving a measured length of the wire; a member having a channel extending generally in the direction of said path for receiving said wire, said member being pivoted to said slide for movement of the member channel between substantial alignment with said slide channel in retracted position of said slide and disalignment in extended position for cutting said measured length of wire in said slide channel to form a pin in the slide channel; a part mounted on said frame for free reciprocal movement in the general direction of said path between adjustable abutments on said frame, said part having a channel extending generally in the direction of said path for receiving said wire; independent means associated with said part and member for holding said wire in response part and member channels against movement away from said slide outer end portion and permitting movement through the channels toward said portion for measuring a length of said wire as said slide moves from retracted to extended position and for positioning a measured length of wire in said slide channel as said slide moves from extended to retracted position; a ram mounted adjacent said slide for reciprocal sliding movement in the general direction of said path between retracted and extended positions;; means for reciprocating said ram between its retracted and extended positions; means latching said slide and ram for movement together from retracted to extended position of the slide as said ram moves from retracted position to an intermediate position, and latching said slide and said frame and unlatching said slide and ram for movement of said ram independently of said slide from intermediate to extended position of said ram; cooperating means on said ram and member for moving said member channel from alignment to disalignment with said slide channel as said ram moves from intermediate to extended position; a finger pivoted on said ram for movement between positions aligned and disaligned with said slide channel; and cooperating means on said frame and finger for moving said finger into alignment with said slide channel as said ram moves from intermediate to extended position for movement of said finger through said slide channel to move said pin through said slide channel and install the pin on said mounting board.

6. A head for forming a pin from wire and installing the pin on a mounting board, comprising: a frame; a body on said frame and having a channel for receiving the wire; a ram mounted for movement on said frame; a member having a channel aligned with the body channel for receiving said wire and mounted on said frame for movement of the member channel across said body channel to cut the wire extending through said channels to form a pin in said body channel; means responsive to movement of said ram for moving said member channel across said body channel; means on said member for holding said wire against movement away from said body channel; and means on said ram for moving said pin through the body channel and installing said pin on the mounting board in responsive to movement of said ram.

7. A head for installing a pin on a mounting board, comprising: a frame; a slide mounted for movement on said frame and having a channel for receiving the pin; a ram mounted for movement on said frame; a finger mounted on said ram for movement between disalignment and alignment with said channel; and cooperating means on said ram and frame moving said finger into alignment with said channel for movement through said channel to move said pin through the channel and install said pin on the mounting board in response to movement of said ram on the frame.

8. A head for forming a pin from wire and installing the pin on a mounting board, comprising: a frame; a body on said frame and having a passage adjacent an end of the head for receiving the wire; a ram mounted for movement on said frame; a member having a channel aligned with the passage for receiving said wire and mounted on said frame for movement of the channel across said passage to cut the wire extending through said passage and channel to form a pin in said passage; means for moving said channel across said passage; means for holding said wire against movement away from said passage; and means for moving said pin through the passage and installing said pin on the mounting board.

9. A head for installing a pin on a mounting board, comprising: a frame; a slide mounted for movement on said frame and having a channel for receiving the pin; a ram mounted for movement on said frame; a finger mounted on said ram for movement between disalignment and alignment with said channel; and means responsive to movement of said ram for moving said finger into alignment with said channel for movement through said channel to move said pin through the channel and install said pin on the mounting board.

10. A head for handling a pin and installing the pin on a mounting board, comprising: a frame; a mechanism mounted for movement in opposite directions on said frame; means responsive to movement of said mechanism in a first of said opposite directions for positioning a pin; means responsive to movement of said mechanism in the other of said opposite directions for moving said pin for release from the head and installation on the mounting board.

No references cited.